(12) United States Patent
Wang

(10) Patent No.: US 8,162,514 B2
(45) Date of Patent: Apr. 24, 2012

(54) ILLUMINATION DEVICE WITH A FIRE-FIGHTING FUNCTION

(75) Inventor: Bily Wang, Hsinchu (TW)

(73) Assignee: Harvatek Corporation, Hsinchu (TW)

( * ) Notice: Subject to any disclaimer, the term of this patent is extended or adjusted under 35 U.S.C. 154(b) by 341 days.

(21) Appl. No.: 12/243,215

(22) Filed: Oct. 1, 2008

(65) Prior Publication Data

US 2010/0079975 A1    Apr. 1, 2010

(51) Int. Cl.
*F21V 5/00* (2006.01)
*F21V 9/12* (2006.01)

(52) U.S. Cl. ........ 362/318; 362/602; 362/612; 362/623; 362/624

(58) Field of Classification Search .................. 362/318, 362/22, 96, 602, 612, 623–624
See application file for complete search history.

(56) References Cited

U.S. PATENT DOCUMENTS

| | | | | |
|---|---|---|---|---|
| 7,210,809 B2 * | 5/2007 | Blackstock | ................... | 362/101 |
| 7,520,072 B2 * | 4/2009 | Yu | ................................... | 40/570 |
| 7,771,104 B2 * | 8/2010 | Iwasaki | ........................ | 362/628 |
| 2007/0069882 A1 * | 3/2007 | Mahajan | ........................ | 340/500 |

* cited by examiner

*Primary Examiner* — Diane Lee
*Assistant Examiner* — Sean Gramling
(74) *Attorney, Agent, or Firm* — Rosenberg, Klein & Lee

(57) ABSTRACT

An illumination device with a fire-fighting function includes a transparent hollow casing, fire-fighting water, a light-emitting unit, and a light-guiding unit. The transparent hollow casing has a receiving space. The fire-fighting water is filled into the receiving space of the transparent hollow casing. The light-emitting unit has a plurality of light-emitting elements disposed beside one or more lateral sides of the transparent hollow casing. The light-guiding unit is disposed over the transparent hollow casing. Hence, when fire accident happens, the transparent hollow casing will melt and crack due to the developed over-heat, and the fire-fighting water is sprayed out from the receiving spaces in order to extinguish one part of flames. Therefore, the present invention can be used as a lighting device or can be used as a fire-fighting device when fire accident happens.

18 Claims, 8 Drawing Sheets

ILLUMINATION DEVICE WITH A FIRE-FIGHTING FUNCTION

BACKGROUND OF THE INVENTION

1. Field of the Invention

The present invention relates to an illumination device, and particularly relates to an illumination device with a fire-fighting function.

2. Description of Related Art

Illumination devices are necessary for daily use in home, office or other public places. The illumination device installed at a ceiling can generate high brightness efficiency in order to provide light for people. Hence, the illumination devices are mostly installed on ceilings.

In addition, fire-fighting sprinklers are usually installed with a fire-fighting pipe system in a building. Hence, when fire accident happens, a sensor in each fire-fighting sprinkler can sense the fire and the fire-fighting sprinklers can spray water from the fire-fighting pipe in order to extinguish flames.

However, the designs of illumination devices and fire-fighting sprinklers are separated, and the structure of the fire-fighting pipe system is complex. Hence, the design and maintain costs are increased.

SUMMARY OF THE INVENTION

One particular aspect of the present invention is to provide an illumination device with a fire-fighting function. The fire-fighting water is filled into the receiving space of a transparent hollow casing. Hence, when fire accident happens, the transparent hollow casing will melt and crack due to the developed over-heat, and the fire-fighting water is sprayed out from the receiving spaces in order to extinguish one part of flames.

In order to achieve the above-mentioned aspects, the present invention provides an illumination device with a fire-fighting function, including: a transparent hollow casing, fire-fighting water, a light-emitting unit, and a light-guiding unit. The transparent hollow casing has a receiving space. The fire-fighting water is filled into the receiving space of the transparent hollow casing. The light-emitting unit has a plurality of light-emitting elements disposed beside one or more lateral sides of the transparent hollow casing. The light-guiding unit is disposed over the transparent hollow casing.

Moreover, one part of the light-emitting elements of the light-emitting unit are electrically connected to a normal power supply as well as to an emergency power supply, the other light-emitting elements of the light-emitting unit are only electrically connected to the normal power supply, and when the normal power supply is cut, the emergency power supply is turned on to supply power. Therefore, the present invention can be used as a lighting device (light beams generated by the light-emitting elements are projected downwards by the reflection of the light-guiding unit) or can be used as a fire-fighting device and an emergency lighting device (one part of the light-emitting elements electrically connected to the emergency power supply can be used to generate emergency brightness) when fire accident happens.

Furthermore, the emergency light-emitting elements are disposed over the transparent hollow casing, the light-emitting elements of the light-emitting unit are electrically connected to a normal power supply, and the emergency light-emitting elements are electrically connected to an emergency power supply. When the normal power supply is cut, the emergency power supply is turned on to supply power. Therefore, the present invention can be used as a lighting device (light beams generated by the light-emitting elements are projected downwards by the reflection of the light-guiding unit) or can be used as a fire-fighting device and an emergency lighting device (the emergency light-emitting elements electrically connected to the emergency power supply can be used to generate emergency brightness) when fire accident happens.

In order to achieve the above-mentioned aspects, the present invention provides an illumination device with a fire-fighting function, including: a plurality of transparent hollow casings, fire-fighting water, a light-emitting unit, and a light-guiding unit. Each transparent hollow casings has a receiving space. The fire-fighting water is filled into the receiving space of each transparent hollow casing. The light-emitting unit has a plurality of light-emitting elements. At least two of the light-emitting elements are respectively disposed beside two opposite lateral sides of each transparent hollow casing or at least one of the light-emitting elements is disposed beside a lateral side of each transparent hollow casing. The light-guiding unit is disposed over the transparent hollow casings.

Hence, the present invention can be used as a lighting device or can be used as a fire-fighting device when fire accident happens. In addition, the present invention does not need to add fire-fighting feed pipes, so that the structure of the present invention is simple, and the design and maintain costs can be reduced.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1A:
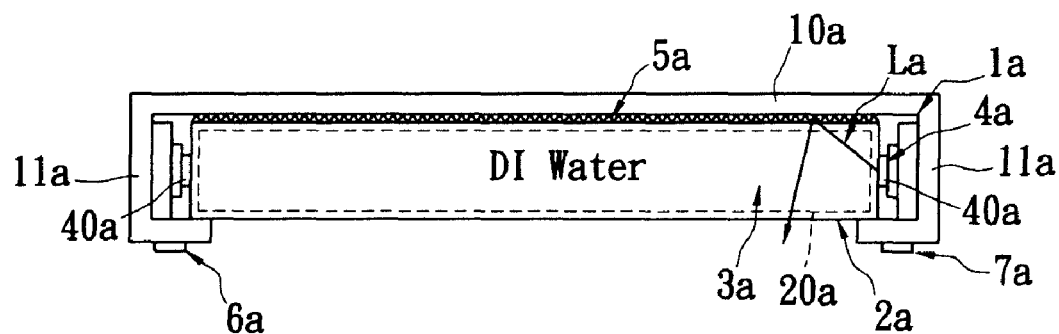
FIG. 1A is a cross-sectional, schematic view of an illumination device with a fire-fighting function according to the first embodiment of the present invention.
Figure 1B:
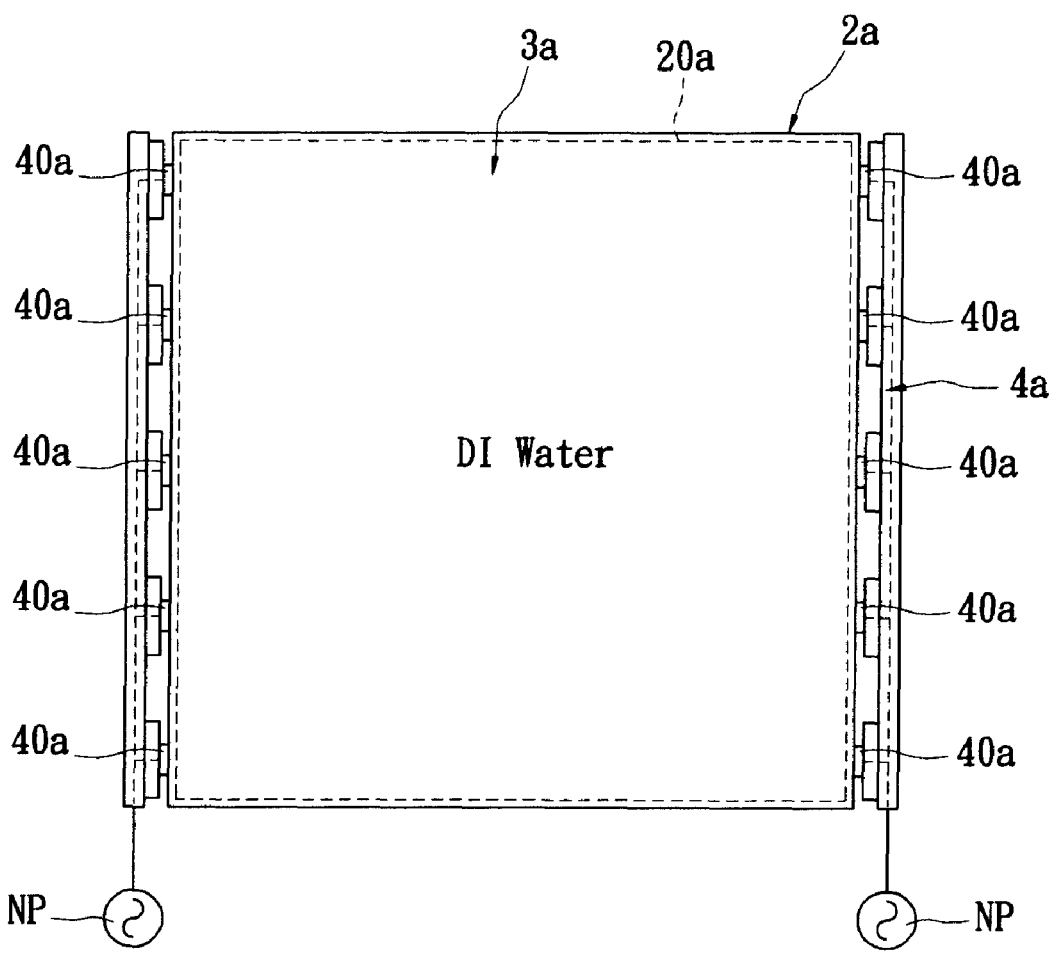
FIG. 1B is a top, schematic view of an illumination device without a frame unit according to the first embodiment of the present invention.

Referring to FIGS. 1A and 1B, the first embodiment of the present invention provides an illumination device with a fire-fighting function, including: a frame unit 1a, a transparent hollow casing 2a, fire-fighting water 3a, a light-emitting unit 4a, and a light-guiding unit 5a.

The frame unit 1a has a plane portion 10a and at least two retaining portions 11a respectively disposed on two opposite lateral sides of the plane portion 10a. Of course, the present invention can add another retaining portions (not shown) in the frame unit 1a in order to make the three retaining portions arranged in a U shape.

Moreover, the transparent hollow casing 2a has a receiving space 20a, and the transparent hollow casing 2a is retained between the two retaining portions 11a. The transparent hollow casing 2a can be made of a transparent material such as PE (Polyethylene). In addition, if the three retaining portions are arranged in a U shape, the transparent hollow casing 2a can be received and retained between the three retaining portions by passing through a concave of the U shape.

Furthermore, the fire-fighting water 3a is filled into the receiving space 20a of the transparent hollow casing 2a. In the first embodiment, the fire-fighting water 3a can be deionised water (DI water), and the refraction of light beam is only lightly affected by the DI water.

In addition, the light-emitting unit 4a has a plurality of light-emitting elements 40a that can be disposed beside one or more lateral sides of the transparent hollow casing 2a. The light-emitting elements 40a are disposed between the frame unit 1a and the transparent hollow casing 2a. In the first embodiment, the light-emitting elements 40a can be a plurality of LEDs (Light-Emitting Diode), and the light-emitting elements 40a are disposed beside two opposite lateral sides of the transparent hollow casing 2a. The light-emitting elements 40a are electrically connected to a normal power supply NP.

Moreover, the light-guiding unit 5a is disposed over the transparent hollow casing 2a. In the first embodiment, the light-guiding unit 5a is disposed on a top surface of the transparent hollow casing 2a. Hence, light beams La generated by the light-emitting elements 40a are projected downwards by the reflection of the light-guiding unit 5a in order to achieve an object of illumination.

Furthermore, the illumination device further includes a smoke-detecting sensor 6a and a temperature sensor 7a both electrically connected to a power source and positioned on the frame unit 5a. In the first embodiment, both the smoke-detecting sensor 6a and the temperature sensor 7a are respectively positioned on two bottom sides of the two retaining portions 11a of the frame unit 1a in order to respectively sense the indoor smoke concentration and the indoor temperature. If the indoor smoke concentration and the indoor temperature are over high, an alarm is started in order to warning indoor peoples.

When fire accident happens, the transparent hollow casing 2a is melted and cracked due to over-heat, and the fire-fighting water 3a is sprayed out from the receiving space 20a in order to extinguish one part of flames. Hence, the present invention can be used as a lighting device or can be used as a fire-fighting device when fire accident happens. In addition, the present invention does not need to add fire-fighting feed pipes, so that the structure of the present invention is simple, and the design and maintain costs can be reduced.

Figure 1D:
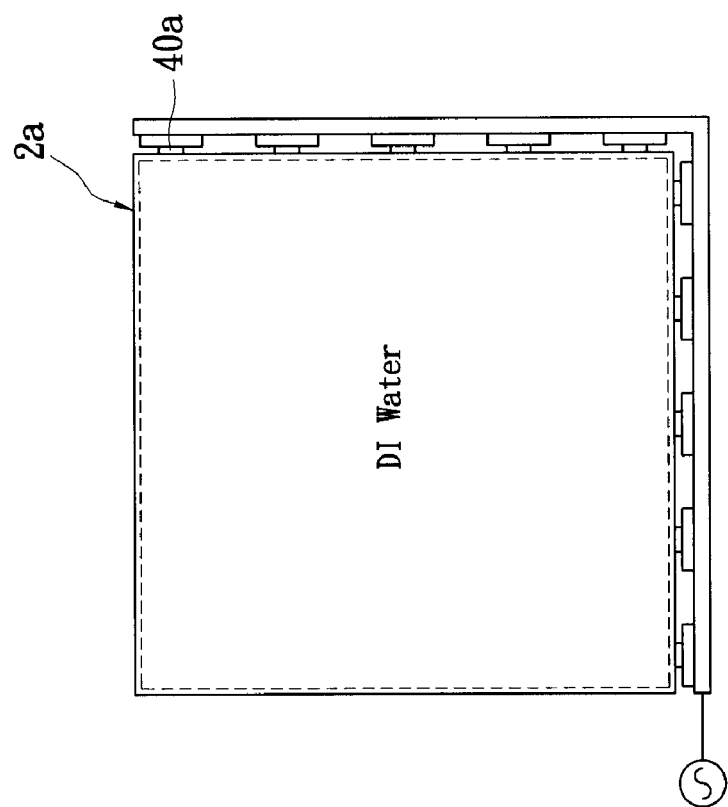
FIG. 1D is a top, schematic view of a third arrangement of the light-emitting elements according to the first embodiment of the present invention.
Figure 1C:
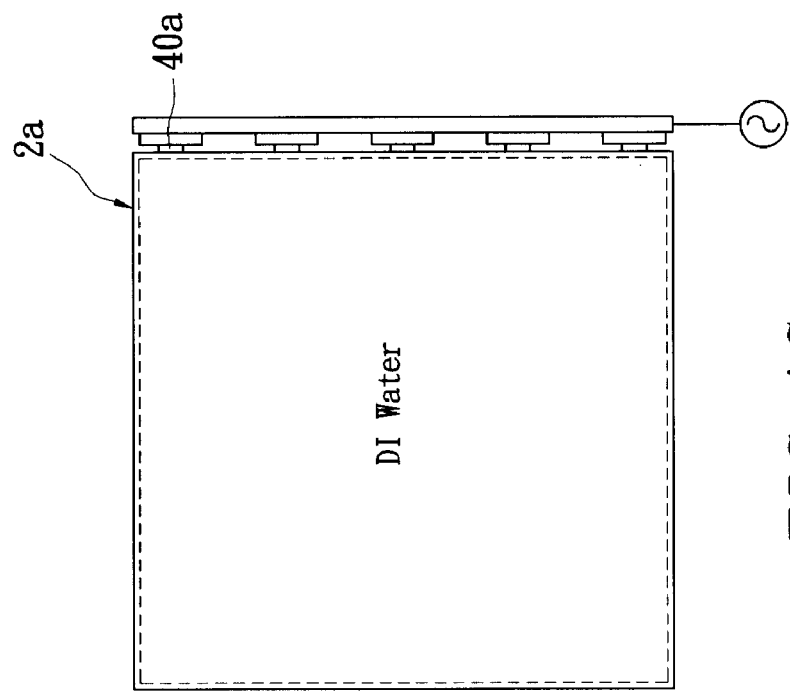
FIG. 1C is a top, schematic view of a second arrangement of the light-emitting elements according to the first embodiment of the present invention.

Referring to FIG. 1C, in the second arrangement, the light-emitting elements 40a are disposed beside the same lateral side of the transparent hollow casing 2a.

Referring to FIG. 1D, in the third arrangement, the light-emitting elements 40a are arranged in an L shape and are disposed beside two lateral sides of the transparent hollow casing 2a.

Figure 1E:
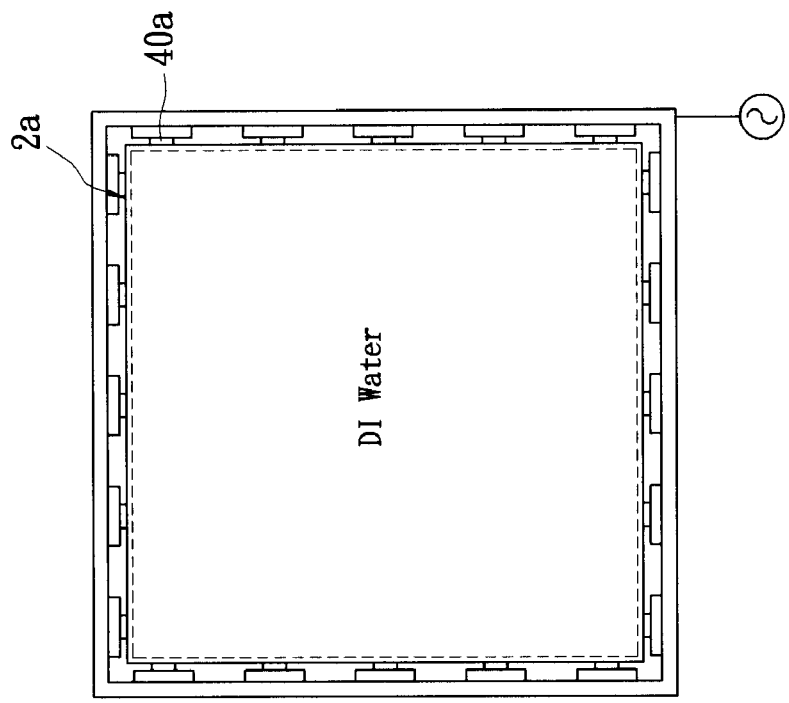
FIG. 1E is a top, schematic view of a fourth arrangement of the light-emitting elements according to the first embodiment of the present invention.

Referring to FIG. 1E, in the fourth arrangement, the light-emitting elements 40a are arranged in a U shape and are disposed beside three lateral sides of the transparent hollow casing 2a.

Figure 1F:
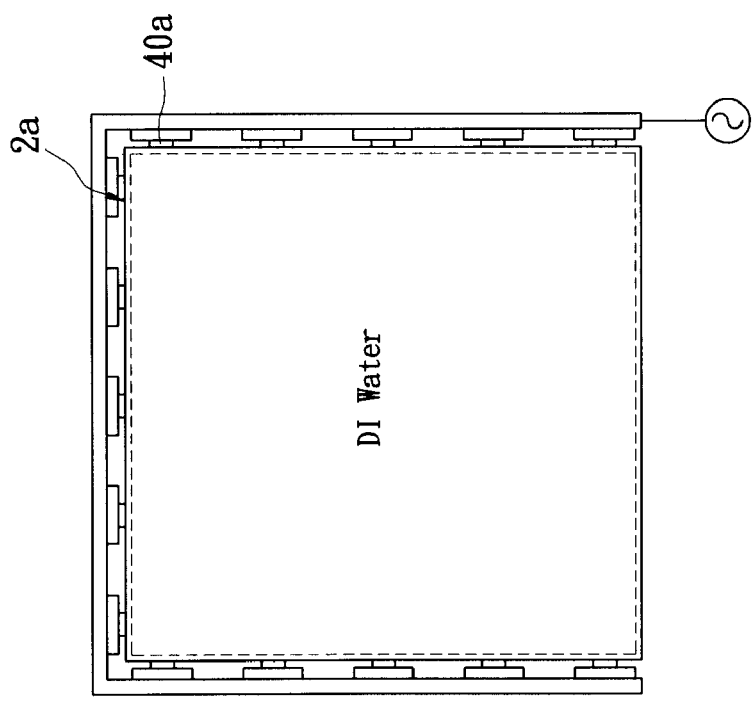
FIG. 1F is a top, schematic view of a fifth arrangement of the light-emitting elements according to the first embodiment of the present invention.

Referring to FIG. 1F, in the fifth arrangement, the light-emitting elements 40a are arranged in a square shape and are disposed beside four lateral sides of the transparent hollow casing 2a.

Figure 2A:
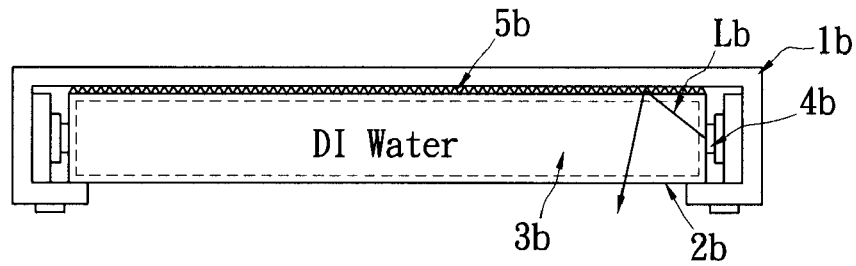
FIG. 2A is a cross-sectional, schematic view of an illumination device with a fire-fighting function according to the second embodiment of the present invention.
Figure 2B:
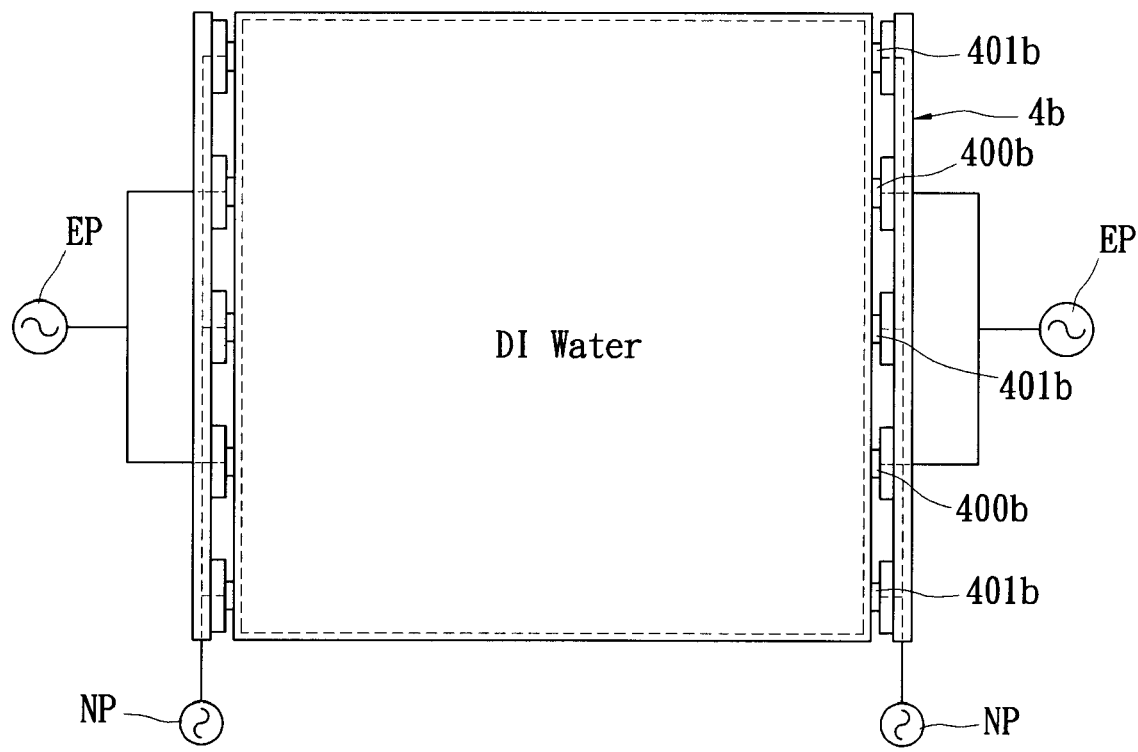
FIG. 2B is a top, schematic view of an illumination device without a frame unit according to the second embodiment of the present invention.

Referring to FIGS. 2A and 2B, the second embodiment of the present invention provides an illumination device with a fire-fighting function, including: a frame unit 1b, a transparent hollow casing 2b, fire-fighting water 3b, a light-emitting unit 4b, and a light-guiding unit 5b.

The difference between the second embodiment and the first embodiment is that: in the second embodiment, one part of the light-emitting elements 400b of the light-emitting unit 4b are electrically connected to a normal power supply NP as well as to an emergency power supply EP, the other light-emitting elements 401b of the light-emitting unit 4b are only electrically connected to the normal power supply NP, and when the normal power supply NP is cut, the emergency power supply EP is turned on to supply power.

Hence, the second embodiment of the present invention can be used as a lighting device (light beams Lb generated by the light-emitting elements 400b, 401b are projected downwards by the reflection of the light-guiding unit 5b) or can be used as a fire-fighting device and an emergency lighting device (one part of the light-emitting elements 400b electrically connected to the emergency power supply EP can be used to generate emergency brightness) when fire accident happens. In addition, the present invention does not need to add fire-fighting feed pipes, so that the structure of the present invention is simple, and the design and maintain costs can be reduced.

Figure 3A:
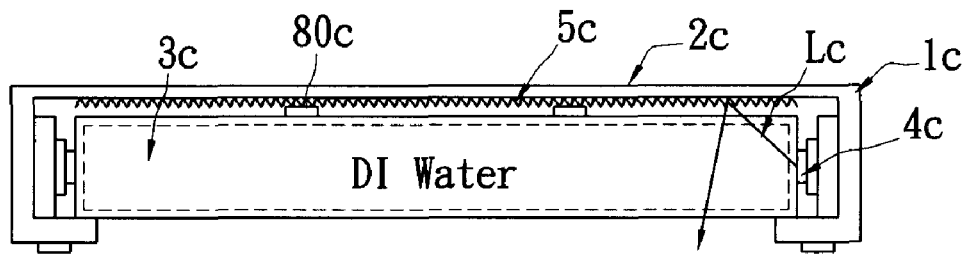
FIG. 3A is a cross-sectional, schematic view of an illumination device with a fire-fighting function according to the third embodiment of the present invention.
Figure 3B:
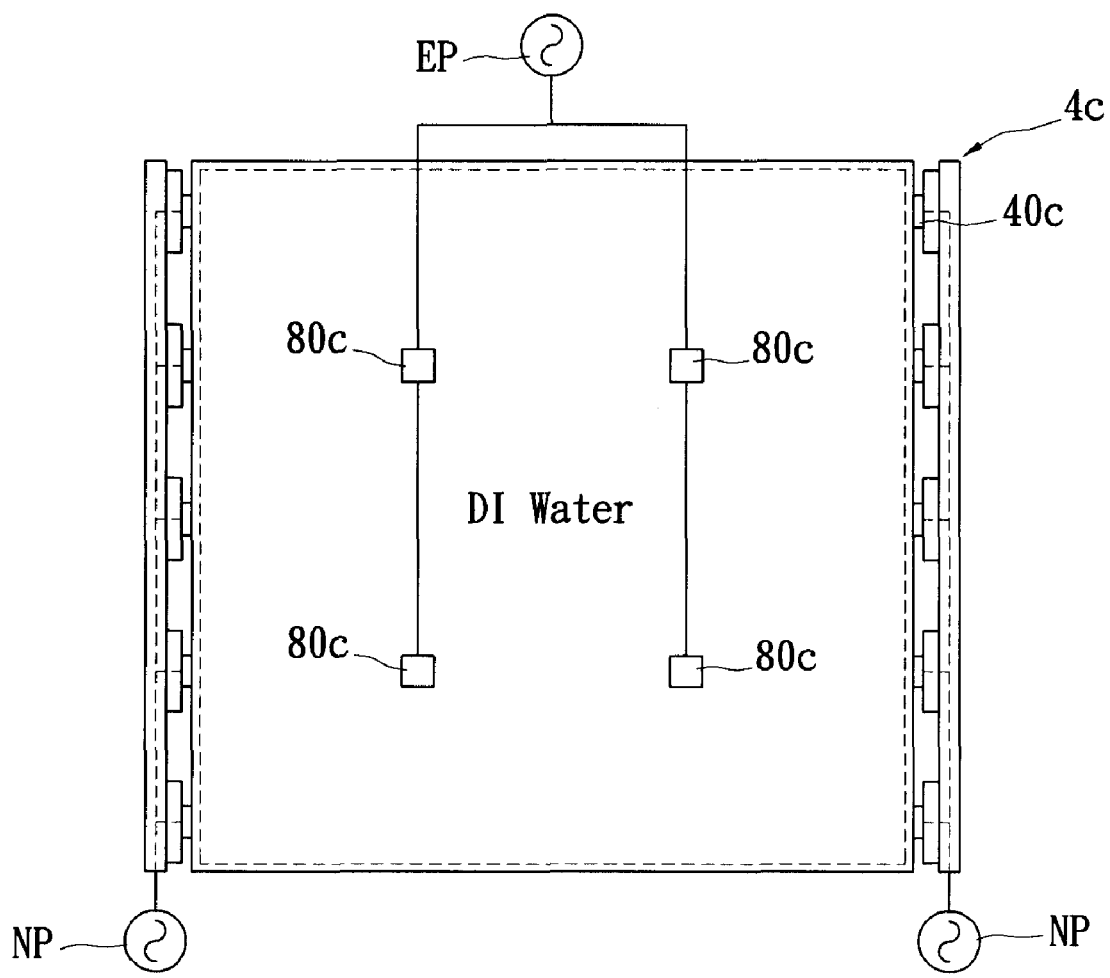
FIG. 3B is a top, schematic view of an illumination device without a frame unit according to the third embodiment of the present invention.

Referring to FIGS. 3A and 3B, the third embodiment of the present invention provides an illumination device with a fire-fighting function, including: a frame unit 1c, a transparent hollow casing 2c, fire-fighting water 3c, a light-emitting unit 4c, and a light-guiding unit 5c.

The difference between the third embodiment, the second embodiment and the first embodiment is that: the third embodiment further includes a plurality of emergency light-emitting elements 80c disposed over the transparent hollow casing 2c, the light-emitting elements 40c of the light-emitting unit 4c are electrically connected to a normal power supply NP, and the emergency light-emitting elements 80c are electrically connected to an emergency power supply EP. When the normal power supply NP is cut, the emergency power supply EP is turned on to supply power.

Hence, the third embodiment of the present invention can be used as a lighting device (light beams Lc generated by the light-emitting elements 40c are projected downwards by the reflection of the light-guiding unit 5c) or can be used as a fire-fighting device and an emergency lighting device (the emergency light-emitting elements 80c electrically connected to the emergency power supply EP can be used to generate emergency brightness) when fire accident happens. In addition, the present invention does not need to add fire-fighting feed pipes, so that the structure of the present invention is simple, and the design and maintain costs can be reduced.

Of course, both the second embodiment and the third embodiment can be combined together. In other words, one part of the light-emitting elements of the light-emitting unit is disposed beside the lateral side of the transparent hollow casing and is electrically connected to a normal power supply as well as to an emergency power supply, the other light-emitting elements of the light-emitting unit are only electrically connected to the normal power supply. In addition, the emergency light-emitting elements are electrically connected to the emergency power supply. When the normal power supply is cut, the emergency power supply is turned on to supply power.

Figure 4A:
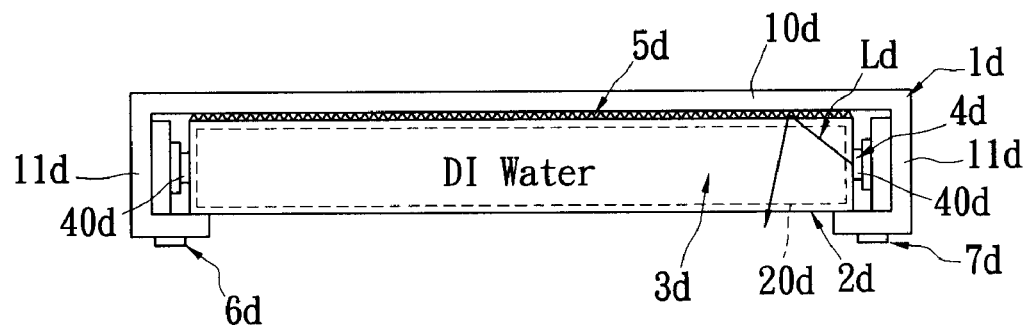
FIG. 4A is a cross-sectional, schematic view of an illumination device with a fire-fighting function according to the fourth embodiment of the present invention.
Figure 4B:
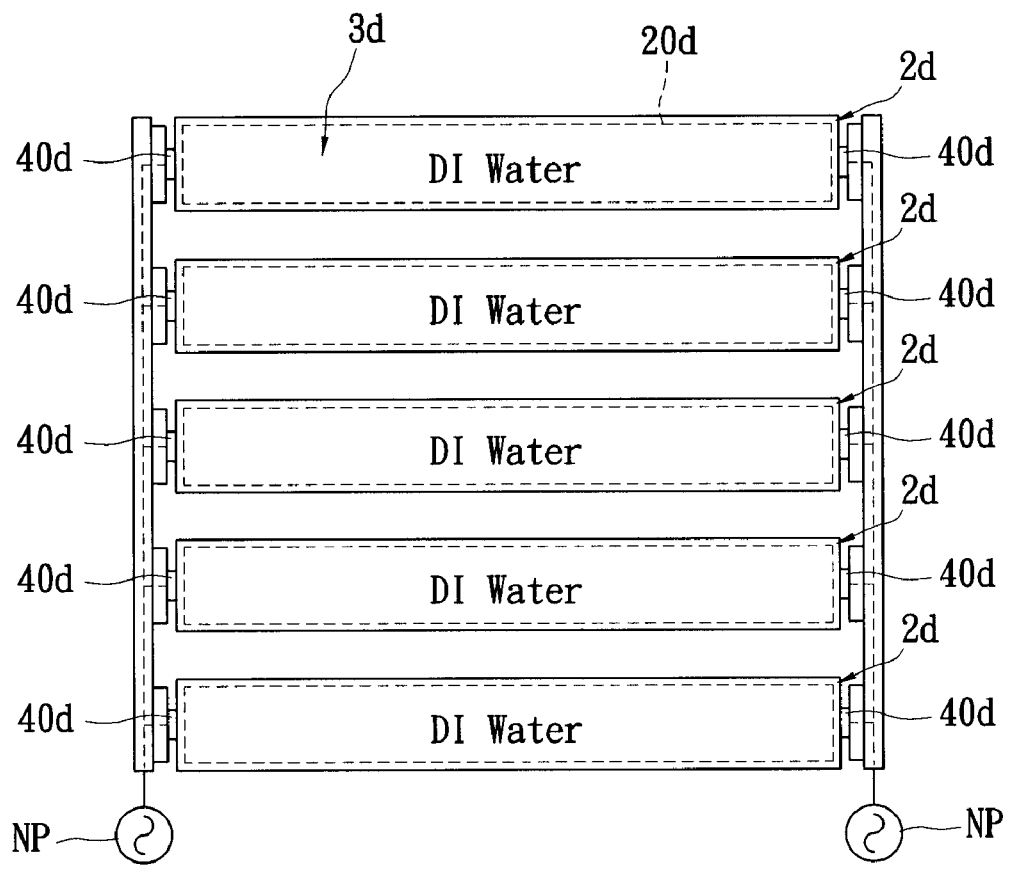
FIG. 4B is a top, schematic view of an illumination device without a frame unit according to the fourth embodiment of the present invention.

Referring to FIGS. 4A and 4B, the fourth embodiment of the present invention provides an illumination device with a fire-fighting function, including: a frame unit 1d, a plurality of transparent hollow casings 2d, fire-fighting water 3d, a light-emitting unit 4d, and a light-guiding unit 5d.

The frame unit 1d has a plane portion 10d and at least two retaining portions 11d respectively disposed on two opposite lateral sides of the plane portion 10d. Of course, the present invention can add another retaining portions (not shown) in the frame unit 1d in order to make the three retaining portions arranged in a U shape.

Moreover, each transparent hollow casing 2d has a receiving space 20d, and each transparent hollow casing 2d is retained between the two retaining portions 11d. The transparent hollow casing 2d can be made of a transparent material such as PE (Polyethylene). In addition, if the three retaining portions are arranged in a U shape, each transparent hollow casing 2d can be received and retained between the three retaining portions by passing through a concave of the U shape.

Furthermore, the fire-fighting water 3d is filled into the receiving spaces 20d of the transparent hollow casings 2d. In the fourth embodiment, the fire-fighting water 3d can be deionised water (DI water), and the refraction of light beam is only lightly affected by the DI water.

In addition, the light-emitting unit 4d has a plurality of light-emitting elements 40d. At least two of the light-emitting elements 40d are respectively disposed beside two opposite lateral sides of each transparent hollow casing 2d or at least one of the light-emitting elements 40d is disposed beside a lateral side of each transparent hollow casing 2d. The light-emitting elements 40d are disposed between the frame unit 1d and the transparent hollow casings 2d. In the fourth embodiment, the light-emitting elements 40d can be a plurality of LEDs (Light-Emitting Diode), and the light-emitting elements 40d are electrically connected to a normal power supply NP.

Moreover, the light-guiding unit 5d is disposed over the transparent hollow casings 2d. In the fourth embodiment, the light-guiding unit 5d is disposed on top surfaces of the transparent hollow casings 2d. Hence, light beams Ld generated by the light-emitting elements 40d are projected downwards by the reflection of the light-guiding unit 5d in order to achieve an object of illumination.

Furthermore, the illumination device further includes a smoke-detecting sensor 6d and a temperature sensor 7d both electrically connected to a power source and positioned on the frame unit 5d. In the fourth embodiment, both the smoke-detecting sensor 6d and the temperature sensor 7d are respectively positioned on two bottom sides of the two retaining portions 11d of the frame unit 1d in order to respectively sense the indoor smoke concentration and the indoor temperature. If the indoor smoke concentration and the indoor temperature are over high, an alarm is started in order to warning indoor peoples.

When fire accident happens, the transparent hollow casings 2d will melt and crack due to the developed over-heat, and the fire-fighting water 3d is sprayed out from the receiving spaces 20d in order to extinguish one part of flames. Hence, the present invention can be used as a lighting device or can be used as a fire-fighting device when fire accident happens. In addition, the present invention does not need to add fire-fighting feed pipes, so that the structure of the present invention is simple, and the design and maintain costs can be reduced.

Figure 5A:
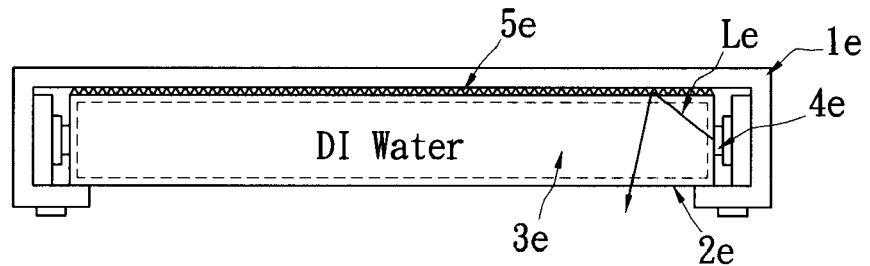
FIG. 5A is a cross-sectional, schematic view of an illumination device with a fire-fighting function according to the fifth embodiment of the present invention.
Figure 5B:
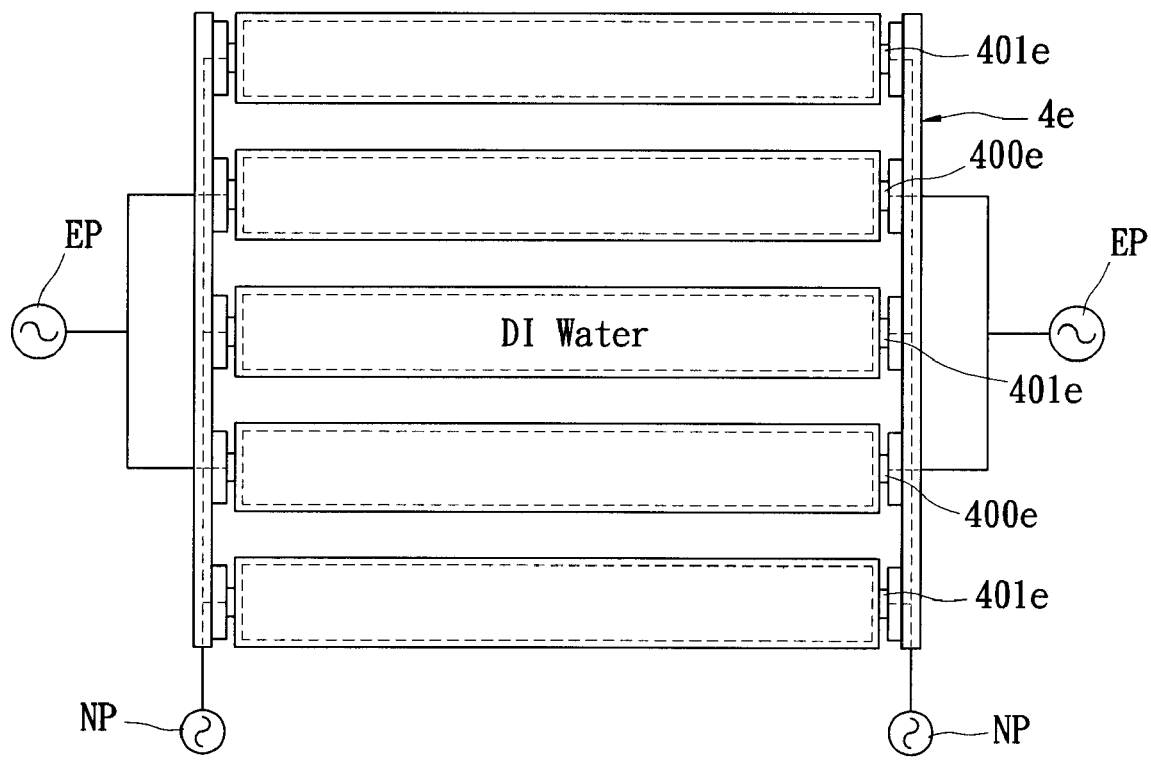
FIG. 5B is a top, schematic view of an illumination device without a frame unit according to the fifth embodiment of the present invention.

Referring to FIGS. 5A and 5B, the fifth embodiment of the present invention provides an illumination device with a fire-fighting function, including: a frame unit 1e, a plurality of transparent hollow casings 2e, fire-fighting water 3e, a light-emitting unit 4e, and a light-guiding unit 5e.

The difference between the fifth embodiment and the fourth embodiment is that: in the fifth embodiment, one part of the light-emitting elements 400e of the light-emitting unit 4e are electrically connected to a normal power supply NP as well as to an emergency power supply EP, the other light-emitting elements 401e of the light-emitting unit 4e are only electrically connected to the normal power supply NP, and when the normal power supply NP is cut, the emergency power supply EP is turned on to supply power.

Hence, the fifth embodiment of the present invention can be used as a lighting device (light beams Le generated by the light-emitting elements 400e, 401e are projected downwards by the reflection of the light-guiding unit 5e) or can be used as a fire-fighting device and an emergency lighting device (one part of the light-emitting elements 400e electrically connected to the emergency power supply EP can be used to generate emergency brightness) when fire accident happens. In addition, the present invention does not need to add fire-fighting feed pipes, so that the structure of the present invention is simple, and the design and maintain costs can be reduced.

Figure 6A:
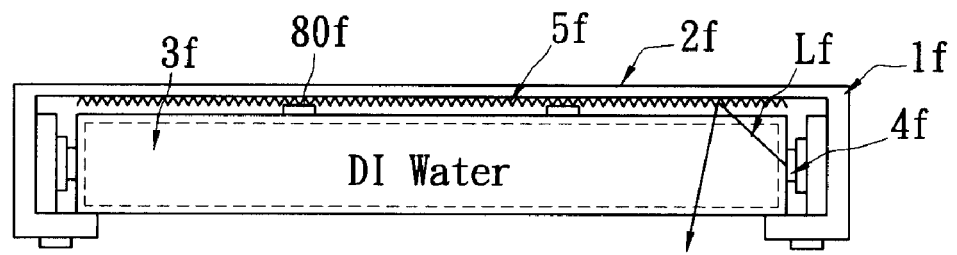
FIG. 6A is a cross-sectional, schematic view of an illumination device with a fire-fighting function according to the sixth embodiment of the present invention.
Figure 6B:
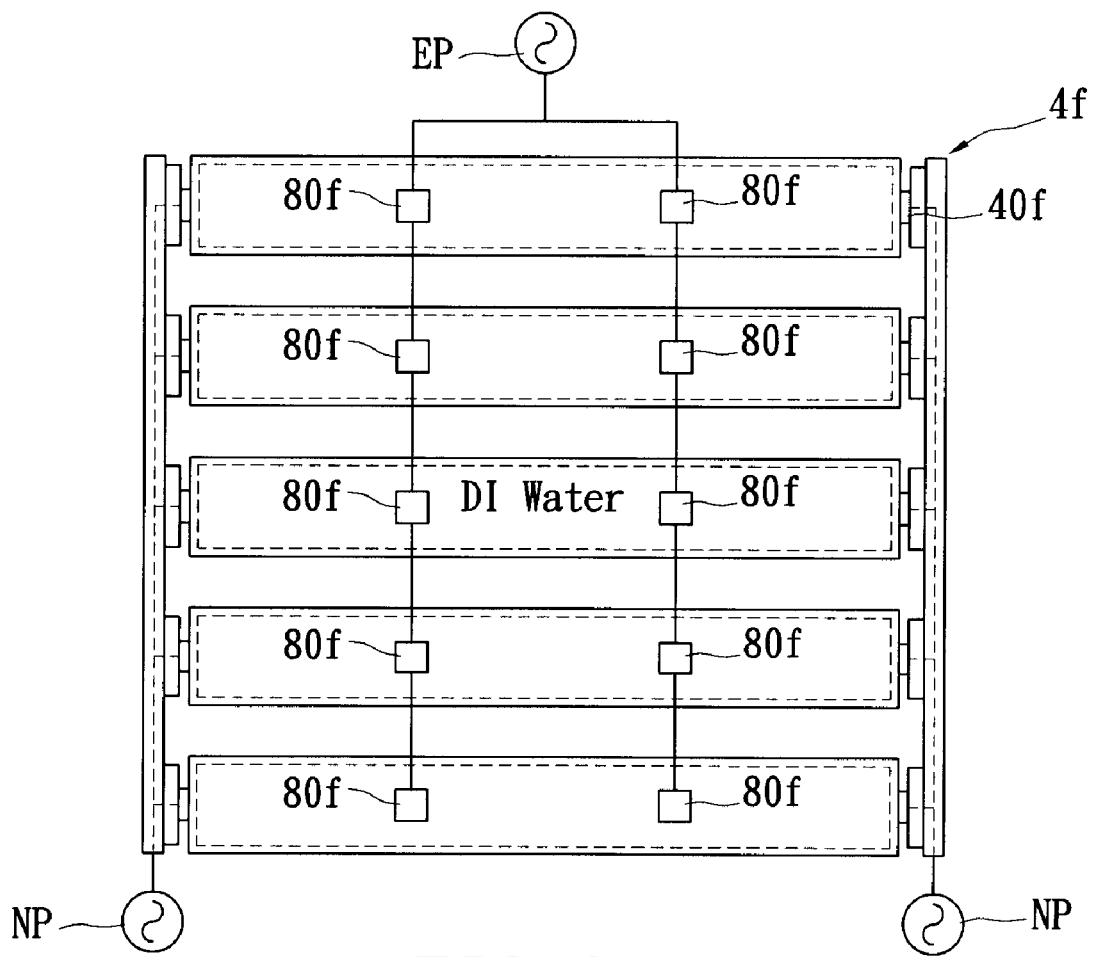
FIG. 6B is a top, schematic view of an illumination device without a frame unit according to the sixth embodiment of the present invention.

Referring to FIGS. 6A and 6B, the sixth embodiment of the present invention provides an illumination device with a fire-fighting function, including: a frame unit 1f, a plurality of transparent hollow casings 2f, fire-fighting water 3f, a light-emitting unit 4f, and a light-guiding unit 5f.

The difference between the sixth embodiment, the fifth embodiment and the fourth embodiment is that: the sixth embodiment further includes a plurality of emergency light-emitting elements 80f disposed over the transparent hollow casings 2f, the light-emitting elements 40f of the light-emitting unit 4f are electrically connected to a normal power supply NP, and the emergency light-emitting elements 80f are electrically connected to an emergency power supply EP. When the normal power supply NP is cut, the emergency power supply EP is turned on to supply power.

Hence, the third embodiment of the present invention can be used as a lighting device (light beams Lf generated by the light-emitting elements 40f are projected downwards by the reflection of the light-guiding unit 5f) or can be used as a fire-fighting device and an emergency lighting device (the emergency light-emitting elements 80f electrically connected to the emergency power supply EP can be used to generate emergency brightness) when fire accident happens. In addition, the present invention does not need to add fire-fighting feed pipes, so that the structure of the present invention is simple, and the design and maintain costs can be reduced.

Of course, both the second embodiment and the third embodiment can be combined together. In other words, one part of the light-emitting elements of the light-emitting unit is disposed beside the lateral sides of the transparent hollow casings and is electrically connected to a normal power supply as well as to an emergency power supply, the other light-emitting elements of the light-emitting unit are only electrically connected to the normal power supply. In addition, the emergency light-emitting elements are electrically connected to the emergency power supply. When the normal power supply is cut, the emergency power supply is turned on to supply power.

In conclusion, the illumination device of the present invention has the following advantages:

1. The present invention does not need to add fire-fighting feed pipes, so that the structure of the present invention is simple, and the design and maintain costs can be reduced.

2. The fire-fighting water is filled into the receiving space of each transparent hollow casing. Hence, when fire accident happens, the transparent hollow casings will melt and crack due to the developed over-heat, and the fire-fighting water is sprayed out from the receiving spaces in order to extinguish one part of flames. Hence, the present invention can be used as a lighting device or can be used as a fire-fighting device when fire accident happens.

3. One part of the light-emitting elements of the light-emitting unit are electrically connected to a normal power supply as well as to an emergency power supply, the other light-emitting elements of the light-emitting unit are only electrically connected to a normal power supply, and when the normal power supply is cut, the emergency power supply is turned on to supply power. Therefore, the present invention can be used as a lighting device (light beams generated by the light-emitting elements are projected downwards by the reflection of the light-guiding unit) or can be used as a fire-fighting device and an emergency lighting device (one part of the light-emitting elements electrically connected to the emergency power supply can be used to generate emergency brightness) when fire accident happens.

4. The emergency light-emitting elements are disposed over the transparent hollow casing, the light-emitting elements of the light-emitting unit are electrically connected to a normal power supply, and the emergency light-emitting elements are electrically connected to an emergency power supply. When the normal power supply is cut, the emergency power supply is turned on to supply power. Therefore, the present invention can be used as a lighting device (light beams generated by the light-emitting elements are projected downwards by the reflection of the light-guiding unit) or can be used as a fire-fighting device and an emergency lighting device (the emergency light-emitting elements electrically connected to the emergency power supply can be used to generate emergency brightness) when fire accident happens.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fire-fighting illumination device, comprising:
a transparent hollow casing having a downwardly facing side, an opposing top side and a plurality of lateral sides forming a sealed receiving space therein, the sealed receiving space being filled with only water, the transparent hollow casing being formed of a material that melts and cracks in response to heat from a fire external thereto and thereby spray the water from the receiving space to douse the fire;
a light-emitting unit having a plurality of light-emitting elements facing one or more of said lateral sides of the transparent hollow casing; and
a light-reflecting unit disposed on the top side of the transparent hollow casing to reflect light beams generated by the light-emitting elements for emission from the downwardly facing side.

2. The fire-fighting illumination device as claimed in claim 1, wherein the water is deionised water.

3. The fire-fighting illumination device as claimed in claim 1, wherein each light-emitting element is an LED.

4. The fire-fighting illumination device as claimed in claim 1, wherein the light-emitting elements are disposed beside the same lateral side of the transparent hollow casing.

5. The fire-fighting illumination device as claimed in claim 1, wherein the light-emitting elements are arranged as an L shape and are disposed beside two lateral sides of the transparent hollow casing.

6. The fire-fighting illumination device as claimed in claim 1, wherein the light-emitting elements are disposed beside two opposite lateral sides of the transparent hollow casing.

7. The fire-fighting illumination device as claimed in claim 1, wherein the light-emitting elements are arranged as a U shape and are disposed beside three lateral sides of the transparent hollow casing.

8. The fire-fighting illumination device as claimed in claim 1, wherein the light-emitting elements are arranged as a square shape and are disposed beside four lateral sides of the transparent hollow casing.

9. The fire-fighting illumination device as claimed in claim 1, wherein one part of the light-emitting elements are electrically connected to a normal power supply as well as to an emergency power supply, the other light-emitting elements are only electrically connected to the normal power supply, and when the normal power supply is cut off, the emergency power supply is turned on to supply power.

10. The fire-fighting illumination device as claimed in claim 1, further comprising: a frame unit having a plane portion and at least two retaining portions respectively disposed on two opposite lateral sides of the plane portion in order to retain the transparent hollow casing, and the light-emitting elements are disposed between the frame unit and the transparent hollow casing.

11. The fire-fighting illumination device as claimed in claim 10, further comprising: a smoke-detecting sensor positioned on the frame unit.

12. The fire-fighting illumination device as claimed in claim 10, further comprising: a temperature sensor positioned on the frame unit.

13. The fire-fighting illumination device as claimed in claim 1, further comprising: a plurality of emergency light-emitting elements disposed between the top side of the transparent hollow casing and the light-reflecting unit, the light-emitting elements are electrically connected to a normal power supply, the emergency light-emitting elements are electrically connected to an emergency power supply, and when the normal power supply is cut off, the emergency power supply is turned on to supply power.

14. A fire-fighting illumination device comprising:
- a frame unit having a plane portion and at least two retaining portions respectively disposed on two opposite lateral sides of the plane portion;
- a plurality of transparent hollow casings disposed within said frame unit, the plurality of transparent hollow casings extending longitudinally between the at least two retaining portions in laterally spaced relationship, each of said transparent hollow casings having a downwardly facing portion, an opposing upwardly facing portion and a plurality of laterally facing portions forming a sealed receiving space therein, each sealed receiving space being filled with only water, each transparent hollow casing being formed of a material that melts and cracks in response to heat from a fire external thereto and thereby each independently sprays the water from a corresponding one of the receiving spaces to douse the fire;
- a light-emitting unit having a plurality of light-emitting elements disposed within the frame unit, at least two of the light-emitting elements respectively face two opposite longitudinal ends of each transparent hollow casing; and
- a light-reflecting unit disposed within the frame unit and extending above the upwardly facing portions of the transparent hollow casings to reflect light beams generated by the light-emitting elements for emission from the downwardly facing portions thereof.

15. The fire-fighting illumination device as claimed in claim 14, wherein the static fire-fighting water is deionised water.

16. The fire-fighting illumination device as claimed in claim 14, wherein one part of the light-emitting elements are electrically connected to a normal power supply as well as to an emergency power supply, the other light-emitting elements are electrically connected to the normal power supply, and when the normal power supply is cut off, the emergency power supply is turned on to supply power.

17. The fire-fighting illumination device as claimed in claim 14, further comprising: a smoke-detecting sensor and a temperature sensor respectively positioned on the frame unit.

18. The fire-fighting illumination device as claimed in claim 14, further comprising: a plurality of emergency light-emitting elements disposed between the upwardly facing portions and the transparent hollow casings and the light-reflecting unit, the light-emitting elements are electrically connected to a normal power supply, the emergency light-emitting elements are electrically connected to an emergency power supply, and when the normal power supply is cut off, the emergency power supply is turned on to supply power.

\* \* \* \* \*